United States Patent [19]

Yamamoto et al.

[11] Patent Number: 5,081,196
[45] Date of Patent: Jan. 14, 1992

[54] TERMINAL-MODIFIED AROMATIC IMIDE OLIGOMER COMPOSITION

[75] Inventors: Shinji Yamamoto; Hideho Tanaka; Kazuyoshi Fujii, all of Hirakata, Japan

[73] Assignee: Ube Industries, Ltd., Ube, Japan

[21] Appl. No.: 398,435

[22] Filed: Aug. 25, 1989

[30] Foreign Application Priority Data

Aug. 30, 1988 [JP] Japan ............... 63-213732

[51] Int. Cl.$^5$ .............. C08L 77/00; C08L 77/06; C08L 77/10
[52] U.S. Cl. ................ 525/419; 525/418; 525/426
[58] Field of Search ............ 525/426, 418, 419

[56] References Cited

U.S. PATENT DOCUMENTS

| | | | |
|---|---|---|---|
| 4,061,812 | 12/1977 | Gilwee, Jr. et al. | 428/117 |
| 4,251,419 | 2/1981 | Heilman et al. | 525/426 |
| 4,255,313 | 3/1981 | Antonoplos et al. | 524/104 |
| 4,316,845 | 2/1982 | D'Alelio et al. | 525/426 |
| 4,537,947 | 8/1985 | D'Alelio | 525/426 |
| 4,608,833 | 8/1986 | Ohbayashi et al. | 525/426 |
| 4,939,214 | 7/1990 | Imai et al. | 525/426 |

Primary Examiner—John C. Bleutge
Assistant Examiner—W. R. H. Clark
Attorney, Agent, or Firm—Finnegan, Henderson, Farabow, Garrett & Dunner

[57] ABSTRACT

A terminal-modified aromatic imide oligomer composition having an improved curing performance and useful for cured polyimide articles having excellent mechanical properties and heat-resistance, comprising 100 parts by weight of a terminal-modified aromatic imide oligomer consisting of a reaction product of a biphenyltetracarboxylic dianhydride with an aromatic diamine and an acetylenically unsaturated monoamine compound, having acetylenically unsaturated terminal groups and exhibiting a logarithmic viscosity number of 0.1 to 1.0 at 30° C.; and 1 to 20 parts by weight of an unsaturated imide compound consisting of a reaction product of a biphenyltetracarboxylic dianhydride with an acetylenically unsaturated monoamine compound.

16 Claims, No Drawings

TERMINAL-MODIFIED AROMATIC IMIDE OLIGOMER COMPOSITION

BACKGROUND OF THE INVENTION

1. Field of the Invention

The present invention relates to a terminal-modified imide oligomer composition. More particularly, the present invention relates to a composition comprising a terminal-modified aromatic imide oligomer and an unsaturated aromatic imide compound and useful for forming fiber-reinforced resinous articles having an excellent mechanical strength, modulus of elasticity and heat-resistance.

2. Description of the Related Art

It is known that polyimide resin has a superior heat-resistance and mechanical properties, and thus is useful as a matrix resinous material for shaped resinous articles and fiber-reinforced composite resinous articles.

Recently, Japanese Unexamined Patent Publication Nos. 59-167,569, 60-250,030, 60-260,624, 60-260,625, 61-247,733 and 62-29,584 disclosed various polyimide resins which are reaction products of (a) an aromatic tetracarboxylic dianhydride, such as pyromellitic dianhydride or benzophenonetetracarboxylic dianhydride, with an aromatic diamine and (c) an unsaturated reactive compound, which has unsaturated terminal groups, and is capable of being cured and is useful as a matrix resinous material for prepregs.

The above-mentioned conventional polyimide resins are disadvantageous in that the polyimide resin must be produced from a specific diamine compound, which is very expensive and difficult to obtain; that the resultant polymer exhibits an unsatisfactorily low solubility in an organic solvent and thus is difficult to impregnate in a reinforcing fiber material; that in the preparation of a solution of the polyimide resin, a special organic solvent having a high boiling temperature must be employed; and/or that the resultant polyimide resin exhibits an excessively high melting point, and thus the aimed product must be produced at a very high temperature, which causes a deterioration of the quality of the product.

Japanese Unexamined Patent Publication No. 1-139,632 discloses a terminal-modified aromatic imide oligomer consisting essentially of a oligomerization-imidization reaction product of a biphenyltetracarboxylic dianhydride with an aromatic diamine and an unsaturated monoamine.

The above-mentioned terminal-modified aromatic imide oligomer is disadvantageous in that, when used as a matrix resin for the prepreg, the prepreg containing the terminal-modified aromatic imide oligomer requires a long time for completion of the curing thereof, the resultant cured resin molecules frequently have a number of non-cross-linked terminals thereof, and the resultant cured article has an unsatisfactory mechanical strength.

SUMMARY OF THE INVENTION

An object of the present invention is to provide a terminal-modified aromatic imide oligomer composition capable of being cured at a high curing rate.

Another object of the present invention is to provide a terminal-modified aromatic imide oligomer composition useful for producing shaped aromatic imide polymer articles having an excellent mechanical strength and heat resistance.

The above-mentioned objects can be obtained by the terminal-modified aromatic imide oligomer composition of the present invention, which comprises (A) a first ingredient comprising at least one type of terminal-modified aromatic imide oligomer which is a product of an oligomerization-imidization reaction, in an organic solvent of (a) an aromatic tetracarboxylic acid component comprising (i) 70 to 100 molar% of at least one member selected from the group consisting of biphenyltetracarboxylic acids and dianhydrides, esters and salts thereof and (ii) 0 to 30 molar% of at least one additional member selected from the group consisting of non-biphenyl type tetracarboxylic acids and anhydrides, esters and salts thereof, with (b) an aromatic diamine component comprising (iii) 80 to 100 molar% of at least one aromatic diamine and (iv) 0 to 20 molar% of at least one non-aromatic diamine and (c) a monoamine component comprising at least one unsaturated monoamine having an acetylene group, which oligomer has unsaturated terminal radicals located at the terminals of the oligomer molecule and a plurality of imide structures located in the inside portion of the oligomer molecule and which oligomer exhibits a logarithmic viscosity number of 0.1 to 1.0 determined at a concentration of 0.5 g/100 ml in a solvent consisting of N-methyl-2-pyrrolidone at a temperature of 30° C; and (B) a second ingredient comprising at least one type of unsaturated imide compound, which is a product of a reaction, in an organic solvent, of (d) an aromatic tetracarboxylic acid component comprising (v) 70 to 100 molar% of at least one member selected from the group consisting of biphenyltetracarboxylic acids and dianhydrides, esters and salts thereof and (vi) 0 to 30 molar% of at least one additional member selected from the group consisting of non-biphenyl type tetracarboxylic acids and anhydrides, esters and salts thereof, with (e) a monoamine component comprising at least one unsaturated monoamine compound having an acetylene group, which imide compound has unsaturated terminal radicals located at the terminals of the imide compound molecule and at least one imide structure located in the inside portion of the imide compound molecule, said second ingredient (B) being in an amount of 1 to 20 parts by weight per 100 parts by weight of the first ingredient (A).

DESCRIPTION OF THE PREFERRED EMBODIMENTS

The terminal-modified aromatic imide oligomer composition of the present invention comprises (A) a first ingredient comprising at least one type of terminal-modified aromatic imide oligomer and (B) a second ingredient comprising at least one type of unsaturated aromatic imide compound.

The terminal-modified aromatic imide oligomer in the first ingredient (A) comprises a product of an oligomerization-imidization reaction, in an organic medium, of (a) an aromatic tetracarboxylic acid component with (b) an aromatic diamine component and (c) a mono-amine component.

The aromatic tetracarboxylic acid component (a) comprises 70 to 100 molar% of at least one member selected from the group consisting of (i) biphenyltetracarboxylic acids and dianhydrides, esters, preferably lower alkyl esters, and salts of the above-mentioned acids, and (ii) 0 to 30 molar% of at least one additional member selected from the group consisting of non-biphenyl type tetracarboxylic acids and anhydrides, esters and salts thereof different from the above-mentioned biphenyltetracarboxylic acid compounds (i).

The biphenyltetracarboxylic acid compounds (i) usable for the present invention is preferably selected from the group consisting of 3,3',4,4'-biphenyltetracarboxylic acid, 2,3,3',4,-biphenyltetracarboxylic acid and dianhydrides, esters, preferably lower alkyl esters, and salts of the above-mentioned acids.

More preferably, 3,3',4,4'-biphenyltetracarboxylic dianhydride (s-BPDA) and 2,3,3',4,-biphenyltetracarboxylic dianhydride (a-BPDA) are used.

The biphenyltetracarboxylic acid compound (i) in the aromatic tetracarboxylic acid component (a) is used in an amount of 70 to 100 molar%, preferably 80 to 100 molar%, more preferably 90 to 100 molar%. When the amount of the biphenyltetracarboxylic acid compound (i) is less than 70 molar%, the resultant terminal-modified aromatic imide oligomer composition exhibits a poor solubility in organic solvents, and thus has a poor processability.

The non-biphenyl type tetracarboxylic acid compound (ii) is contained in an amount of 0 to 30 molar%, preferably 0 to 20 molar%, more preferably 0 to 10 molar%, in the aromatic tetracarboxylic acid component (a) and is selected from the tetracarboxylic acid compounds other than the biphenyltetracarboxylic acid compounds (i), which include non-biphenyl type aromatic tetracarboxylic acids, for example, 3,3',4,4'-benzophenonetetracarboxylic acid, pyromellitic acid, 2,2-bis(3',4,-dicarboxyphenyl)propane, bis(3,4-dicarboxyphenyl)methane, bis(3,4-dicarboxyphenyl)ether, bis(3,4-dicarboxyphenyl)thioether, bis(3,4-dicarboxyphenyl)phosphine, bis(3,4-dicarboxyphenyl)sulfone; and aliphatic tetracarboxylic acids, for example, butane tetracarboxylic acid, and dianhydrides, esters and salts of the above-mentioned acid. Preferably, 3,3',4,4'-benzophenonetetracarboxylic dianhydride (BTDA) and pyromellitic dianhydride (PMDA) are employed.

The aromatic diamine component (b) comprises (iii) 80 to 100 molar%, preferably 90 to 100%, of at least one aromatic diamine, and (iv) 0 to 20 molar%, preferably 0 to 10 molar%, of at least one non-aromatic diamine.

When the content of the aromatic diamine (iii) in the aromatic diamine component (b) is less than 70 molar%, the resultant terminal-modified aromatic imide oligomer (A) provides a cured product having a poor heat resistance and mechanical strength.

The aromatic diamine (iii) usable for the present invention can be selected from the group consisting of:

(I diamino-monophenyl compounds
(1) phenylene diamine compounds
(2) xylylene diamine compounds
(3) diamino-trialkylbenzene compounds
  (II) diamino diphenyl compounds
(4) diamino-benzidine compounds
(5) diamino-diphenylether compounds
(6) diamino-diphenylthioether compounds
(7) diamino-benzophenone compounds
(8) diamino-diphenylsulfine compounds
(9) diamino-diphenylsulfide compounds
(10) diamino-diphenylsulfone compounds
(11) diamino-diphenylalkane compounds
  (III) diamino-triphenyl compounds
(12) diamino-bis(phenoxy) benzene compounds
  (IV) diamino-tetraphenyl compounds
(13) diamino-bis[(phenoxy)phenyl]propane compounds

(14) diamino-bis(phenoxy)diphenylsulfone compounds

Preferably, the aromatic diamine (iii) is selected from the group consisting of: diamino-diphenyl ether compounds, for example, 4,4'-diaminodiphenylether (DADE), 3,4'-diaminodiphenylether, and 3,3'-diaminodiphenylether; diamino-diphenylalkane compounds, for example, 3,3'-diaminodiphenylmethane, 4,4,-diaminodiphenylmethane, 3,4'diaminodiphenylmethane, bis(2,6-diethyl-4-aminophenyl)methane, bis(2-ethyl-6-methyl-4-aminophenyl)methane, 2,2-bis(3-aminophenyl)propane, 2,2-bis (4-amino-phenyl)propane, 2,2-bis (3-chloro-4-aminophenyl)propane and 2,2-bis (4-amino-3-hydroxyphenyl)hexafluoropropane; diaminobis(phenoxy)benzene compounds, for example, 1,3-bis(4-aminophenoxy)benzene (TPE-R), 1,3-bis(3-aminophenoxy)benzene, 1,4-bis(4-aminophenoxy)benzene (TPE-Q), and 1,4-bis(3-aminophenoxy)benzene; diamino-bis[4-(phenoxy)phenyl] propane compounds, for example, 2,2-bis[4-(4-aminophenoxy)phenyl] propane (BAPP), and 2,2-bis[4-(4-aminophenoxy)phenyl ] hexafluoropropane (BAFP); and diamino-bis(phenoxy)-diphenylsulfone compounds, for example, 4,4'-bis(4-aminophenoxy)diphenylsulfone, bis[4-(4-aminophenoxy)phenyl]sulfone (4-BAPS) and bis[4-(3-aminophenoxy)phenyl]sulfone (3-BAPS).

The non-aromatic diamine (iv) usable for the present invention can be selected from diamino polymeric compounds, for example, α,ω-polysiloxane diamine, polyoxypropylene diamine and polyethylene glycol dianiline.

The monoamine component (c) comprises at least one unsaturated monoamine having an acetylene group (carbon-to-carbon triple bond) and a primary amino group and is capable of reacting with a pair of carboxyl groups in the aromatic tetracarboxylic acid compound to form an imide structure.

The unsaturated monoamine in the monoamine component (c) can be selected from, for example, the group consisting of:

(I) aliphatic acetylenically unsaturated diamino compounds, for example, propargyl amine, 3-aminobutyne, 4-aminobutyne, 5-aminopentyne, 6-aminohexyne, 7-aminoheptyne, 4-amino-3-methylbutyne, and 4-aminopentyne; and (II) aromatic acetylenically unsaturated monoamine compounds, for example, 3-aminophenylacetylene and 4-aminophenylacetylene.

The terminal-modified aromatic imide oligomer in the first ingredient (A) is provided with unsaturated terminal radicals each having an acetylene group (carbon-to-carbon triple bond), for example, propagyl radical, phenylacetylene radical, located at the terminals of, and a plurality, preferably 5 or more, of imide structure located in the inside portion of the oligomer molecule.

Also, the terminal-modified aromatic imide oligomer in the first ingredient (A) exhibits a logarithmic viscosity number of 0.1 to 1, preferably 0.2 to 0.8, more preferably 0.3 to 0.7, determined at a concentration of 0.5 g/100 ml in a solvent consisting of N-methyl-2-pyrrolidone at a temperature of 30° C. That is, the terminal-modified aromatic imide oligomer usable for the present invention has a relatively large molecular weight corresponding to the above-mentioned logarithmic viscosity number and a melting point of from 100° C. to 300° C., preferably from 150° C. to 270° C. This oligomer is in the state of a solid (powdery) at ambient atmospheric temperature and has a high solubility in various organic solvents.

The terminal-modified aromatic imide oligomer is produced by the oligomerization-imidization reaction of the above-mentioned components (a), (b), and (c) in an organic solvent.

The organic solvent usable for the present invention preferably comprises at least one member selected from the group consisting of amide type solvents, for example, N,N-dimethylformamide, N,N-dimethylacetamide, N-methyl-2-pyrrolidone (NMP), and N-methylcaprolactum; sulfur or phosphorus atomcontaining solvents, for example, dimethylsulfoxide, hexamethylenephosphoramide, dimethylsulfone, tetramethylenesulfone and dimethyltetramethylenesulfone; phenol type solvents, for example, cresol and phenol; and other solvents, for example, pyridine, ethylene glycol and tetramethylurea.

In the preparation of the terminal-modified aromatic imide oligomer, the aromatic tetracarboxylic acid component (a), the aromatic diamine component (b) and the monoamine component (c) are oligomerized in the organic solvent at a temperature of 100° C. or less, preferably 80° C. or less, to produce an amido (amic) acid oligomer.

Preferably, the molar amount, in terms of carboxylic dianhydride (or a pair of carboxyl radical) equivalent, of the aromatic tetracarboxylic acid component (a) is substantially equal to the total molar amount, in terms of total amine equivalent, of the aromatic diamine component (b) and the monoamine component (c).

The amido acid oligomer is imidized at a low temperature of 0° C. to 140° C. in the presence of an imidizing agent, for example, acetic anhydride, or by heating at a high temperature of 140° C. to 250° C., to dehydrateimide cyclize. The resultant aromatic imide oligomer has unsaturated terminal radicals having an addition cross-linking reactivity.

In a preferable process of producing the terminal-modified aromatic imide oligomer, an aromatic tetracarboxylic acid component (a) comprising 3,3',4,4'-or 2,3,3',4'-biphenyltetracarboxylic dianhydride, an aromatic diamine component (b) and a monoamine component (c) are uniformly dissolved in an amide type solvent and are reacted with each other at a temperature of 5° C. to 60° C. for 1 to 120 minutes while stirring, and then the resultant solution of the amido acid oligomer in the solvent is heated at a temperature of from 140° C. to 250° C., preferably 150° C. to 200° C. and maintained at this temperature for 5 to 180 minutes while stirring, to produce the terminal-modified aromatic imide oligomer, and finally, the resultant product solution is cooled to room temperature. In the above-mentioned process, all the reaction operations are preferably carried out in an inert gas atmosphere, consisting of, for example, nitrogen or argon gas.

The cooled product solution is subjected to a procedure for isolating the resultant terminal-modified aromatic imide oligomer from the solvent by, for example, adding water to the product solution and collecting the oligomer in the form of fine particles.

The isolated oligomer may be dissolved in an organic solvent and supply to the user.

If this organic solvent is the same as that used in the oligomer-preparation process, the oligomer solution obtained from the preparation process may be directly supplied to the user or concentrated or diluted before use.

The second ingredient (B) usable for the present invention comprises at least one type of unsaturated imide compound having acetylenically unsaturated terminal radicals located at the terminals of the imide compound molecule and at least one imide structure located in the inside portion of the imide compound molecule.

The unsaturated imide compound is a product of a reaction, in an organic solvent, of (d) an aromatic tetracarboxylic acid component comprising (V) 70 to 100 molar%, preferably 80 to 100 molar%, more preferably 90 to 100 molar%, of at least one member selected from the group consisting of biphenyl-tetracarboxylic acids and dianhydrides, esters, preferably lower alkyl esters, and salts thereof, and (vi) 0 to 30 molar%, preferably 0 to 20 molar%, more preferably 0 to 10 molar%, of at least one additional member selected from the group consisting of non-biphenyl type tetracarboxylic acids and dianhydrides, esters and salts thereof, with (e) a monoamine component comprising at least one unsaturated monoamine compound having an acetylene group.

In the reaction, the aromatic tetracarboxylic acid component (d) is used in a substantially equal molar amount in terms of carboxylic dianhydride (or a pair of carboxyl radicals) equivalent, to the molar amount, in terms of amine equivalent, of the monoamine component (e).

The unsaturated imide compound in the second ingredient (B) has unsaturated terminal groups, for example, propargyl or phenylacetylenyl groups, each having an acetylene radical ($-C\equiv C-$) and thus an addition cross-linking reactivity, and at least one imide structure located in the inside portion of the imide compound molecule.

The unsaturated imide compound usable for the present invention preferably exhibits a logarithmic viscosity number of 0.005 to 0.09, more preferably 0.01 to 0.08, still more preferably 0.01 to 0.05, determined in a concentration of 0.5 g/100 ml in a solvent consisting of N-methyl-2-pyrrolidone at a temperature of 30° C., and thus has a relatively small molecular weight.

The unsaturated imide compound exhibits an excellent solubility in various organic solvents, and is in the state of a powdery solid at room temperature.

In the preparation of the unsaturated imide compound for the second ingredient (B), the biphenyltetracarboxylic acid compound (v) and the non-biphenyl type tetracarboxylic acid compound (vi) can be selected respectively from the same groups as those mentioned for the biphenyltetracarboxylic acid compound (i) and the non-biphenyl type tetracarboxylic acid compound (ii) in the first ingredient (A).

Also, the unsaturated monoamines for the monoamine component (e) can be selected from the same group as that mentioned for the unsaturated monoamine in the monoamine component (c).

Furthermore, the organic solvent for the preparation of the unsaturated imide compound for the second ingredient (B) can be selected from the same group as that used for the preparation of the unsaturated imide compound of the first ingredient (A).

The preparation of the unsaturated imide compound of the second ingredient (B) can be carried out by substantially the same process under substantially the same conditions as those described for the preparation of the terminal-modified aromatic imide oligomer in the first ingredient (A). In the composition of the present invention, the amount of the second ingredient is from 1 to 20%, preferably 1 to 10%, based on the weight of the first ingredient (A).

When the amount of the second ingredient (B) is more than 20% based on the weight of the first ingredient (A), the resultant composition forms a cured article having a number of voids and projections on the surface of the article and exhibiting significantly deteriorated mechanical properties.

Also, if the content of the second ingredient (B) is less than 1%, the resultant composition requires a long time for completing the curing operation, and the resultant cured article exhibits poor physical properties.

The terminal-modified aromatic imide oligomer composition of the present invention can be employed in the following forms.

(I) A solid mixture in which the first ingredient (A) in the form of a fine powder is uniformly mixed in the above-mentioned proportion with the second ingredient (B) in the form of a fine powder.

(II) A melt mixture in which the first ingredient (A) in the form of an uncured melt is uniformly mixed in the above-mentioned proportion with the second ingredient (B) in the form of an uncured melt. (III) A solution mixture wherein the first and second ingredient (A) and (B) are evenly dissolved in the above-mentioned proportions in an organic solvent having a boiling point of 100° C. to 250° C. at room temperature.

(IV) Uncured fiber-reinforced resin material, for example, an uncured preprege, which is produced by impregnating a reinforcing fiber material with the above-mentioned oligomer solution and substantially completely evaporating away the organic solvent from the oligomer solution-impregnated reinforcing fiber material at a low temperature of about 50° C to about 200° C.

When used in the form of a solution, the terminal-modified aromatic imide oligomer is preferably in a concentration of 20 to 60% by weight, more preferably 30 to 50% by weight, and the oligomer solution preferably has a rotation viscosity of 0.1 to 200 poises, more preferably 0.5 to 100 poises, still more preferably 5 to 80 poises, determined at a temperature of 25° C. at a concentration of 20% by weight using a Brookfield type rotation viscosity tester. The oligomer solution having the above-mentioned rotation viscosity can easily penetrate and be easily impregnated in the reinforcing fiber material.

The organic solvent for the oligomer solution can be selected from the same group as that mentioned in the preparation of the terminal-modified aromatic imide oligomer. Especially, the organic solvent preferably comprises at least one member selected from N,N-dimethylacetamide, N,N-diethylformamide, N,N-diethylacetamide and N,N-dimethylformamide, for example, a mixture of N,N-dimethylacetamide and N,N-diethylformamide or of N,N-dimethylacetamide and N,N-dimethylformamide.

Preferably, the oligomer solution is substantially free from poor solvent such as water for the terminalmodified aromatic imide oligomer and is stored at a low temperature, for example, from −5° C. to 30° C., in a dry atmosphere.

The uncured prepreg in which a reinforcing fiber material is impregnated with the terminal-modified aromatic imide oligomer is converted to a shaped prepreg laminate by a conventional fabricating method, for example, reduced pressure bag/autoclave curing method, hot pressing method or sheet winding method. The shaped prepreg laminate is heat-pressed at a temperature of 200° C. to 300° C. under a pressure of about 3 to 15 kg/cm$^2$ to cure the shaped prepreg laminate, and thus provide a fiber reinforced polyimide composite article.

The reinforcing fiber material usable for producing the polyimide article comprises at least one type of fiber selected from glass fibers, polyacrylonitrile-derived carbon fibers, pitch-derived carbon fibers, aramide fibers, alumina fibers, silicon carbide fibers, and Si-Ti-C-O type fibers (available under a trademark of Tyranno fiber from Ube Industries Ltd.)

Those fibers may be surface-treated or sized by a conventional method.

The reinforcing fiber material may be in the form of fiber bundle, yarn bundle, or flat belt in which a number of fibers are arranged in parallel to each other to form a bundle or a flat belt. Alternatively, the reinforcing fiber material is in the form of a nonwoven fabric or woven fabric.

Usually, the fiber-reinforced polyimide resin composite article contains the reinforcing fiber material in a content of about 30% to 80%, preferably 40% to 70%, based on the volume of the article.

In the fiber-reinforced polyimide resin composite article, the cured polyimide resin has a thermal decomposition temperature of 400° C. or more and a second-order transition point ($T_g$) of 250° C. or more, and is reinforced by the reinforcing material. Therefore, the fiber-reinforced polyimide resin composite article exhibits an excellent heat resistance and a superior mechanical strength.

The terminal-modified aromatic imide oligomer composition of the present invention is useful not only for the fiber-reinforced resin article but also as a heat-resistant adhesive agent for polyimide materials, for example, films or sheets, or metal foils.

EXAMPLES

The present invention will be further explained by way of specific examples, which are representative and do not restrict the scope of the present invention in any way.

In the examples, the following tests were carried out.

(1) Measurement of logarithmic viscosity number

The logarithmic viscosity number of the terminal-modified aromatic imide oligomer for the first ingredient (A) or the unsaturated monoamine compound for the second ingredient (B) was determined in the following manner.

The oligomer or compound was dissolved in a concentration of 0.5 g/100 ml in a solvent consisting of N-methyl-2-pyrrolidone. The viscosity of the solution at 30° C. was measured, and the viscosity of the solvent at 30° C. was measured. The logarithmic viscosity number of the oligomer or compound was calculated in accordance with the following equation:

$$\eta\text{inh} = \frac{\ln(V/V_0)}{C}$$

wherein $\eta$inh represents the logarithmic viscosity number of the oligomer or compound, C represents a concentration of the oligomer or compound in the solution, V represents the viscosity of the solution of the oligomer or compound, and $V_0$ represents the viscosity of the solvent.

(2) Gel time (Gellation time)

In accordance with Japanese Industrial Standard (JIS) K7071, a prepreg was prepared by using an oligomer composition to be tested. The prepreg was pressed to cause the oligomer composition to flow out of the prepreg, and the flowing oligomer composition was heated. The gel time of the oligomer composition was determined by observing the change in the stringing property of the oligomer composition.

(3) Mechanical properties

An Instron type universal tester 1185 (trademark of Instron Co.) was used to test the following properties.

(i) Bending test (Three point-bending method
Length of test piece in parallel to the
fibers = 85 mm
Width of test piece = 12.7 mm
Ratio of span to thickness of test piece
= 32
Cross-head speed = 2 mm/min
Test temperature = 23° C.
Test RH = 50% (ASTM 790)

(ii) Interlaminar shear strength (Short beam method)
Length of test piece in parallel to the
fibers = 28 mm
Width of test piece = 12.7 mm
Ratio of span to thickness of test piece
= 4
Cross-head speed = 2 mm/min
Test temperature = 23° C.
Test RH = 50% (ASTM D2344)

(4) Volume content of fibers (vol%)

A test piece (fiber-reinforced rein composite article) was treated with a concentrated sulfuric acid to remove the matrix resin. The weight content of the residual fibers was measured, and the density of the resin composite article was measured. The volume content of the fibers in the resin composite article was calculated from the weight content of the fibers, the density of the article and the density of the fibers in accordance with ASTM D3171.

(5) Volume content of voids (vol%)

In accordance with ASTM D2734, volume content (%) of voids in the fiber-reinforced resin composite article was determined as a difference of the total of the volume content (%) of the fibers and the volume content (%) of the resin, from 100%.

EXAMPLE 1

(i) Preparation of terminal-modified aromatic imide oligomer

A flask having a capacity of 500 ml was charged with:

(a) 105.92 g of 2, 3, 3,,4,-biphenyltetracarboxylic dianhydride (a-BPDA),
(b) 87.70 g of 1,3-bis(4-aminophenoxy)benzene (TPER),
(c) 6.67 g of propargylamine (PA), and
(d) 240 g of N-methyl-2-pyrrolidone
(NMP), the resultant mixture was stirred at 50° C. for one hour while flowing nitrogen gas through the flask to produce a terminal-modified amic acid oligomer, then the reaction mixture was heated to a temperature of 185° C. and maintained at this temperature for one hour while stirring, to produce a terminal-modified aromatic imide oligomer.

The resultant reaction mixture was cooled to room temperature (about 25° C.) then mixed with water to deposit the resultant oligomer in the form of fine particles. The deposited oligomer was collected by filtration, washed twice with methyl alcohol, and dried under a reduced pressure.

The resultant terminal-modified aromatic imide oligomer was in the form of fine particles and had a logarithmic viscosity number of 0.134 at a temperature of 2.5° C.

ii) Preparation of unsaturated imide compound

A flask having a capacity of 500 ml was charged with:

(a) 105.92 g of 2,3,3',4'-biphenyltetracarboxylic dianhydride (a-BPDA),
(b) 39.66 g of propargylamine (PA), and
(c) 582 g of N-methyl-2-pyrrolidone, the resultant reaction mixture was stirred at a temperature of 50° C. for one hour while flowing a nitrogen gas through the flask to produce an acetylenically unsaturated amic compound.

Then the reaction mixture was heated to a temperature of 185° C. and maintained at this temperature for one hour while stirring, to provide an acetylenically unsaturated imide compound.

The resultant reaction mixture was cooled to room temperature (about 25° C.) and mixed with water to allow the resultant unsaturated imide compound to deposit. The deposited product was collected by filtration, washed twice with methyl alcohol at a temperature of 25° C., and dried under a reduced pressure.

The resultant unsaturated imide compound was in the form of fine particles and exhibited a logarithmic viscosity number of 0.02.

(iii) Preparation of a terminal-modified aromatic imide oligomer composition solution A solution was prepared by dissolving 166 g of the terminal-modified aromatic imide oligomer and 9.27 g of the unsaturated imide compound, and 263 g of N,N-dimethyl acetamide (DMAc). The total concentration of the oligomer and the unsaturated imide compound was 40% by weight. The solution had a rotation viscosity of 20 poises at a temperature of 25° C.

(iv) Production of carbon fiber-reinforced prepeg

Carbon fibers (available under a trademark of Besfight HTS 3,000 from Toho Rayon Co.) were impregnated with the above-mentioned terminal-modified aromatic imide oligomer composition solution at a temperature of 25° C. and a relative humidity of 50%. The impregnated carbon fiber bundles were arranged in parallel to each other to form a flat belt and wound around a drum winder. The wound carbon fibers were dried at a temperature of 100° C. for 30 minutes, and carbon fiber-reinforced prepreg was obtained.

In the preparation of the prepreg, it was confirmed that the oligomer composition solution easily penetrated the carbon fibers.

The resultant prepreg contained 7.2% by weight of a volatile substance, and 30.0% by weight of the oligomer composition and exhibited a gellation time of 25 minutes.

(v) Production of cured composite laminate

The prepreg having a thickness of 260 μm was cut to provide a plurality of rectangular pieces each having a length of 260 mm and a width of 90 mm. Eight of the rectangular pieces were laminated in the same direction (0° direction) as each other and pressed. The pressed laminate was placed in an autoclave and heated to a temperature of 180° C., maintained at this temperature for 2 hours, heated to a temperature 250° C., maintained at this temperature for 4 hours, cooled to a temperature of 80° C. and then left to stand at room temperature, to produce a cured composite laminate.

In the production of the cured composite laminate, a highest forming pressure applied to the laminate was 8.5 kg/cm$^2$. Also, the pressure in the bag was maintained at a reduced level of 5 mmHg or less until the temperature inside the autoclave reached 250° C.

The resultant composite laminate was post-cured at a temperature of 300° C. for 2 hours.

The post-cured composite laminate was cut to prepare a plurality of bending test pieces having a length of 85 mm is parallel to the direction in which the fibers extend, and a width of 12.7 mm, and interlaminar shear test pieces having a length of 28 mm is parallel to the fiber direction and a width of 12.7 mm.

The results of the test of flexural modulus of elasticity, and interlaminar shear strength, fiber content by volume, and voids content by volume are shown in Table 1.

EXAMPLE 2

The same procedures as described in Example 1 were carried out except that the unsaturated imide compound was employed in an amount of 18.2 g, and the gel time of the prepreg was 17 minutes.

The test results are shown in Table 1.

EXAMPLE 3

The same procedures as described in Example 1 were carried out except that the carbon fibers were replaced by Si-Ti-C-O type inorganic fibers (available under a trademark of Tyranno fiber, from Ube Industries Ltd., 1600 filaments), and the gel time of the prepreg was 17 minutes.

The test results are shown in Table 1.

COMPARATIVE EXAMPLE 1

The same procedure as described in Example 1 were carried out except that in the preparation of the terminal-modified aromatic imide oligomer composition solution, the unsaturated imide compound was not employed, and the gel time of the prepreg was 35 minutes.

The test results are shown in Table 1.

COMPARATIVE EXAMPLE 2

The same procedures as described in Example 1 were carried out except that, in the preparation of the terminal-modified aromatic imide oligomer composition solution, the unsaturated imide compound was employed at a large amount of 36.4 g (corresponding to 21.9% based on the weight of the terminal-modified aromatic imide oligomer), and the gel time of the prepreg was 30 minutes.

The resultant cured composite laminate had a number of blister-like convexities formed on the surface thereof and was expected to exhibit a very low mechanical properties.

No test was applied to the laminate.

COMPARATIVE EXAMPLE 3

The same procedures as described in Example 3 were carried out except that, in the preparation of the terminal-modified aromatic imide oligomer composition solution, the unsaturated imide compound was not employed, and the gel time of the prepreg was 35 minutes.

The test results are shown in Table 1.

TABLE 1

| Item Example No. | Flexural modulus of elasticity (t/mm$^2$) | Interlaminar shear strength (kg/mm$^2$) | Fiber content by volume (% vol.) | Void content by volume (% vol.) |
|---|---|---|---|---|
| Example 1 | 13.7 | 11.5 | 60 | 0.4 |
| Example 2 | 14.2 | 12.0 | 60 | 0.2 |
| Example 3 | 11.2 | 10.0 | 60 | 0.3 |
| Comparative | | | | |
| Example 1 | 9.0 | 10.7 | 60 | 0.2 |
| Example 3 | 10.1 | 8.9 | 60 | 0.3 |

The composition of the present invention comprises (A) a first ingredient comprising at least one type of terminal-modified aromatic imide oligomer having a relatively large molecular weight and (B) a second ingredient comprising at least one type of unsaturated imide compound having a relatively small molecular weight, in the specific proportions of first and second ingredients (A) and (B).

When employed in a specific amount, the unsaturated imide compound causes the resultant oligomer composition to exhibit a shortened curing time, as shown in Examples 1 to 3. Also, the terminal-modified aromatic imide oligomer causes the resultant cured resin article to exhibit excellent mechanical properties as shown in Table.

The terminal-modified aromatic imide oligomer and the unsaturated imide compound exhibit a high solubility in the organic solvents and have similar melting points, and further, they exhibit similar curing performances at similar curing temperatures. Furthermore, they are closely compatible with each other, and therefore, the composition of the present invention is very stable for storage over a long period.

We claim:

1. A terminal-modified aromatic imide oligomer composition comprising:
   (A) a first ingredient consisting essentially of at least one type of terminal-modified aromatic imide oligomer which is a product of an oligomerization-imidization reaction, in an organic solvent, of reactants consisting essentially of
      (a) an aromatic tetracarboxylic acid component consisting essentially of
         (i) 70 to 100 molar % of at least one member selected from the group consisting of biphenyltetracarboxylic acids and dianhydrides, esters and salts thereof and
         (ii) 0 to 30 molar % of at least one additional member selected from the group consisting of non-biphenyl type tetracarboxylic acids and anhydrides, esters and salts thereof, with
      (b) an aromatic diamine component consisting essentially of
         (iii) 80 to 100 molar % of at least one aromatic diamine, and
         (iv) 0 to 20 molar % of at least one nonaromatic diamine, and
      (c) a monoamine component consisting essentially of at least one unsaturated monoamine compound having an acetylene group, which oligomer has unsaturated terminal radicals located at the terminals of the oligomer molecule and a plurality of imide structures located in the inside portion of the oligomer molecule, and which oligomer exhibits a logarithmic viscosity number of 0.1 to 1.0 determined in the concentration of 0.5 g/100 ml in a solvent consisting of N-methyl-2-pyrrolidone at a temperature of 30° C.; and (B) a second ingredient consisting essentially of at least one type of unsaturated imide compound which is a product of a reaction, in an organic solvent, of reactants consisting essentially of (d) an aromatic tetracarboxylic acid component consisting essentially of (v) 70 to 100 molar % of at least one member selected from the group consisting of biphenyltetracarboxylic acids and dianhydrides, esters and salts thereof and (vi) 0 to 30 molar % of at least one additional member selected from the group consisting of non-biphenyl type tetracarboxylic acids and anhydrides, esters and salts thereof, with (e) a monoamine component consisting essentially of at least one unsaturated monoamine compound having an acetylene group, which unsaturated imide compound has unsaturated terminal radicals located at the terminals of the imide compound molecule and at least one imide structure located in the inside portion of the imide compound molecule, and exhibits a logarithmic viscosity number of 0.005 to 0.05 determined in the concentration of 0.5 g/100 ml in a solvent consisting of N-methyl-2- pyrollidone at a temperature of 30° C., said second ingredient (B) being in an amount of 1 to 20 parts by weight per 100 parts by weight of the first ingredient (A).

2. The composition as claimed in claim 1, wherein the terminal-modified aromatic imide oligomer has a melting point of from 100° C. to 300° C.

3. The composition as claimed in claim 1, wherein the biphenyltetracarboxylic acid compound (i) or (v) in the aromatic tetracarboxylic acid components (a) and (d) are selected from the group consisting of 3,3',4,4'-biphenyltetracarboxylic acid, 2,3,3',4'-biphenyltetracarboxylic acid and dianhydrides, esters and salts of the above-mentioned acids.

4. The composition as claimed in claim 1, wherein the additional tetracarboxylic acid compound (ii) or (vi) in the aromatic tetracarboxylic acid components (a) and (d) is selected from the group consisting of 3,3',4,4'-benzophenone tetracarboxylic acid, pyromellitic acid, 2,2-bis(3',4'-dicarboxyphenyl) propane, bis-(3,4'-dicarboxyphenyl)methane, bis(3,4-dicarboxyphenyl)ether, bis(3,4-dicarboxyphenyl)thioether, bis(3,4-dicarboxyphenyl)phosphine, bis(3,4-dicarboxyphenyl)sulfone, and butane tetracarboxylic acid and dianhydrides, esters and salts of the above-mentioned acids.

5. The composition as claimed in claim 1, wherein the aromatic diamine (iii) is selected from the group consisting of phenylene diamine compounds, xylylene diamine compounds, diamino-trialkylbenzene compounds, diamino-benzidine compounds, diamino-diphenylether compounds, diamino-diphenylthioether compounds, diamino-benzophenone compounds, diamino-diphenylsulfine compounds, diamino diphenylsulfide compounds, diamino-diphenylsulfone compounds, diamino-diphenylalkane compounds, diamino-bis(phenoxy)benzene compounds, diamino-bis[(phenoxy)phenyl]propane compounds and diamino-bis(phenoxy)diphenylsulfone compounds.

6. The composition as claimed in claim 1, wherein the non-aromatic diamine (iv) is selected from the group consisting of α, ω-polysiloxane diamine, polyoxypropylene diamine and polyethylene glycol dianiline.

7. The composition as claimed in claim 1, wherein the unsaturated monoamine in the monoamine components (c) and (e) is selected from propargyl amine, 3-aminobutyne, 4-aminobutyne, 5-aminopentyne, 6-aminohexyne, 7-aminoheptyne, 4-amino-3-methylbutyne, 4-aminopentyne, 3-aminophenylacetylene and 4-aminophenylacetylene.

8. The composition as claimed in claim 1, wherein the organic solvent for the productions of the first and second ingredients (A) and (B) comprises at least one member selected from the group consisting of N,N-dimethylformamide, N,N-dimethylacetamide, N-methyl-2-pyrrolidone, N-methylcaprolactum, dimethylsulfoxide, hexamethylphosphoramide, dimethylsulfone, tetramethylenesulfone, dimethyltetramethylenesulfone, cresol, phenol, pyridine, ethylene glycol, and tetramethyl urea.

9. The composition as claimed in claim 1, which is in the form of a solution in an organic solvent having a boiling point of 100° C. to 250° C.

10. The composition as claimed in claim 9, which is contained in a concentration of 20 to 60% by weight in the organic solution.

11. The composition as claimed in claim 9, wherein the organic solvent comprises at least one member selected from the group consisting of N,N-dimethylacetamide, N,N-diethylformamide, N,N-diethylacetamide and N,N-dimethylformamide.

12. The composition as claimed in claim 1, which is in the form of a prepreg in which an reinforcing fiber material is impregnated with the composition.

13. The composition as claimed in claim 12, wherein the reinforcing fiber material is selected from the group consisting of filament bundles, yarn bundles, flat belt, nonwoven fabrics and woven fabrics.

14. The composition as claimed in claim 12, wherein the reinforcing fiber material in the prepreg is in an amount of 30 to 80% based on the total volume of the prepreg.

15. The composition as claimed in claim 1, wherein the first ingredient (A) consists essentially of a product, in an organic solvent, of an oligomerization-imidization reaction of reactants consisting essentially of (a) the aromatic tetracarboxylic acid component, (b) the aromatic diamine component, and (c) the monoamine component, wherein the molar amount, in terms of carboxylic dianhydride (or a pair of carboxyl radical) equivalent, of the aromatic tetracarboxylic acid component (a) is substantially equal to the total molar amount, in terms of total amine equivalent, of the aromatic diamine component (b) and the monoamine component (c).

16. The composition as claimed in claim 1, wherein the second ingredient (B) consists essentially of a product of an reaction, in an organic solvent, of reactants consisting essentially of (d) the aromatic tetracarboxylic acid component, and (e) the monoamine component, wherein the molar amount, in terms of carboxylic dianhydride (or a pair of carboxyl radical) equivalent, of the aromatic tetracarboxylic acid component (d) is substantially equal to the total molar amount, in terms of total amine equivalent, of the monoamine component (e).

* * * * *